United States Patent [19]
Klinger

[11] Patent Number: 5,297,818
[45] Date of Patent: Mar. 29, 1994

[54] RETAINER FOR POP-TOP INDICATOR

[75] Inventor: Gary Klinger, Allen Park, Mich.

[73] Assignee: ITT Corporation, New York, N.Y.

[21] Appl. No.: 809,826

[22] Filed: Dec. 18, 1991

[51] Int. Cl.$^5$ .......................................... F16L 35/00
[52] U.S. Cl. ..................................... 285/93; 285/319
[58] Field of Search ............... 285/93, 319, 320, 921, 285/322; 29/453

[56] References Cited

U.S. PATENT DOCUMENTS

| | | | |
|---|---|---|---|
| 4,244,608 | 1/1981 | Stuemky | 285/305 |
| 4,753,458 | 6/1988 | Case et al. | 285/93 |
| 4,756,558 | 7/1988 | Beamer | 285/39 |
| 4,783,101 | 11/1988 | Peterson | 285/319 |
| 4,793,637 | 12/1988 | Laipply | 285/39 |
| 4,895,396 | 1/1990 | Washizu | 285/93 |
| 4,913,467 | 4/1990 | Washizu | 285/93 |
| 4,915,420 | 4/1990 | Washizu | 285/93 |
| 4,919,457 | 4/1990 | Moretti | 285/39 |
| 4,925,217 | 5/1990 | Ketcham | 285/93 |
| 4,946,205 | 8/1990 | Washizu | 285/319 |
| 4,948,176 | 8/1990 | Bartholomew | 285/93 |
| 4,979,765 | 12/1990 | Bartholomew | 285/319 |
| 5,002,315 | 3/1991 | Bartholomew | 285/93 |
| 5,152,555 | 10/1992 | Szabo | 285/93 |
| 5,178,424 | 1/1993 | Klinger | 285/93 |

FOREIGN PATENT DOCUMENTS

| | | |
|---|---|---|
| 0505930A3 | 9/1992 | European Pat. Off. . |
| 4003461 | 8/1990 | Fed. Rep. of Germany . |
| 1-148191 | 6/1988 | Japan . |
| 2216213 | 1/1988 | United Kingdom . |

*Primary Examiner*—Eric K. Nicholson
*Attorney, Agent, or Firm*—Dykema Gossett

[57] ABSTRACT

An insertion indicator device (10) is employed in conjunction with a quick connector (12) assembly comprising a male element (14) and a female element (16). The indicator device includes a base member (112) carried within the female element. Two or more leg members (114, 116) extend axially from the base member and terminate adjacent an axial housing opening. A generally annular indicator member is disposed substantially adjacent the opening and releasably engages the ends of the leg members. Means are provided to axially displace the base member upon engagement of the male and female elements to effect separation of the base and indicator members. Lastly, guide means are provided to ensure the maintenance of proper orientation of the indicator device with respect to the quick connector before and during the engagement process.

29 Claims, 4 Drawing Sheets

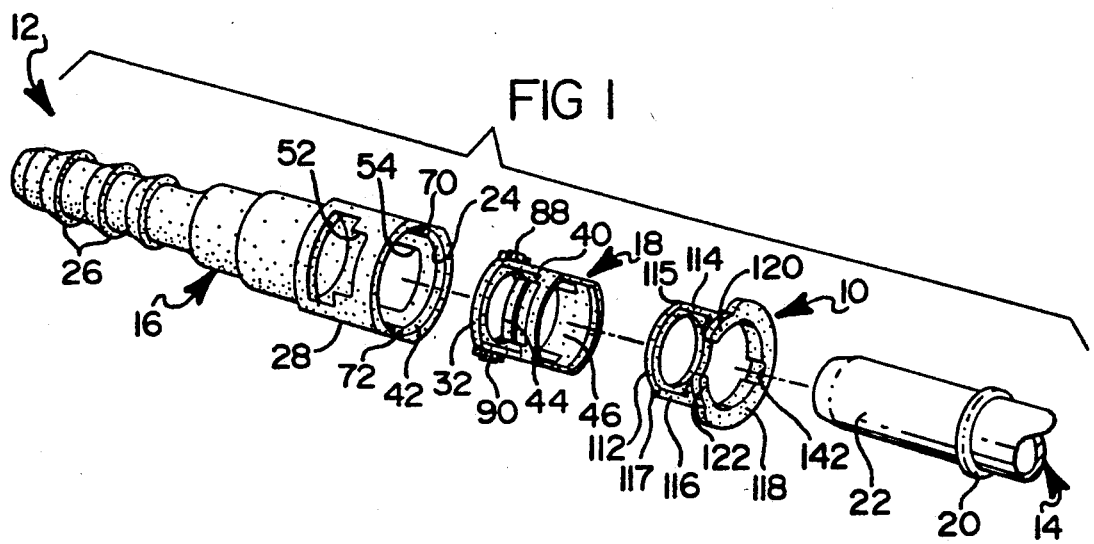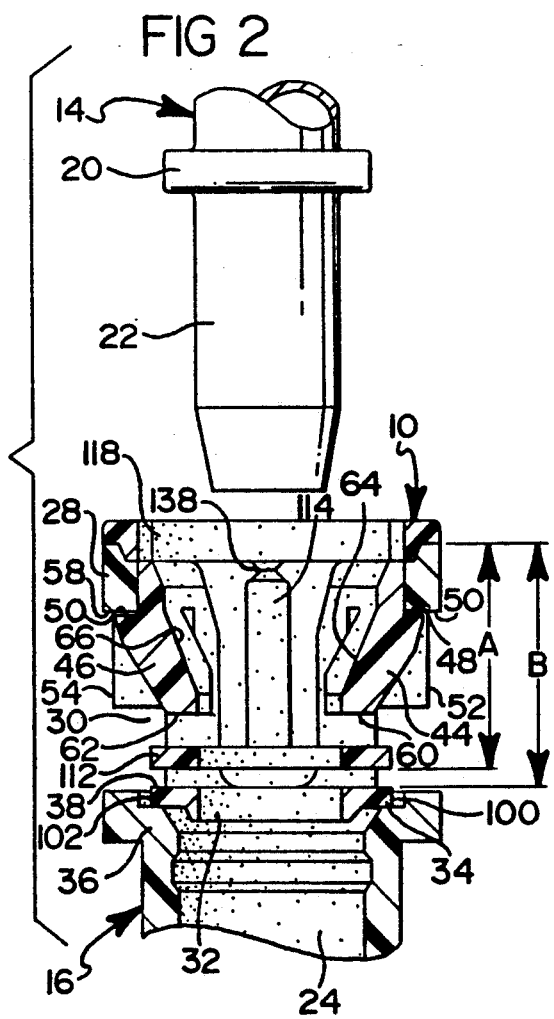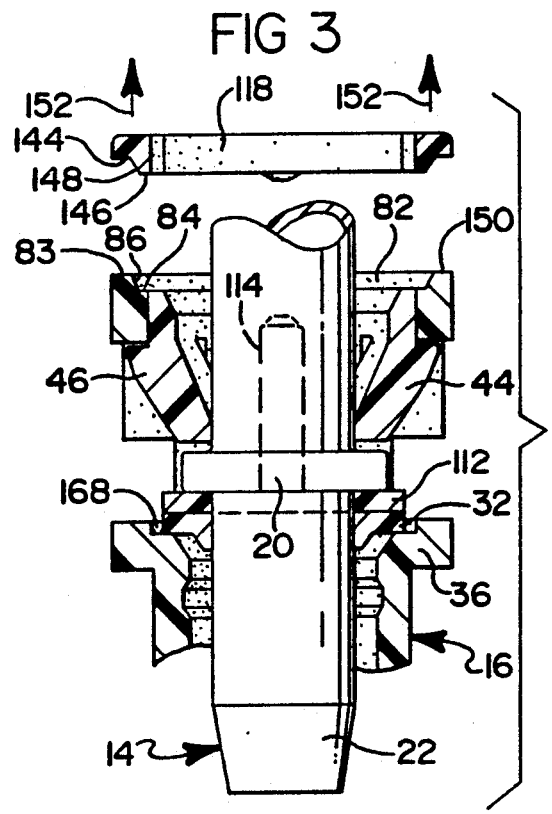

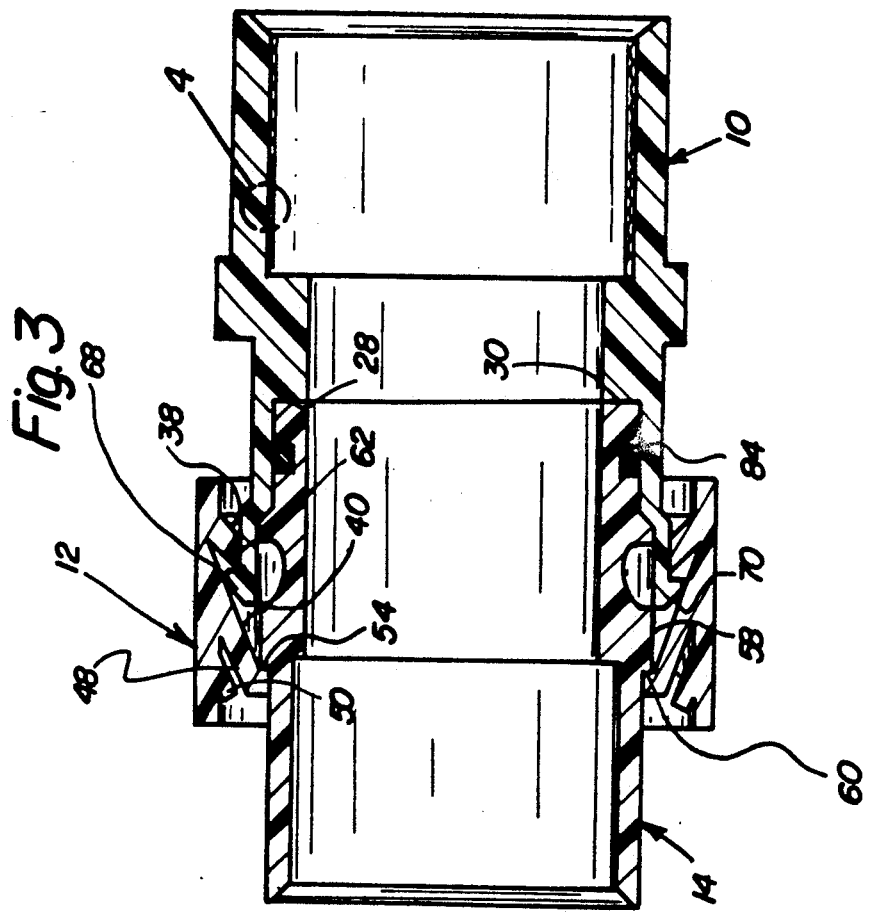

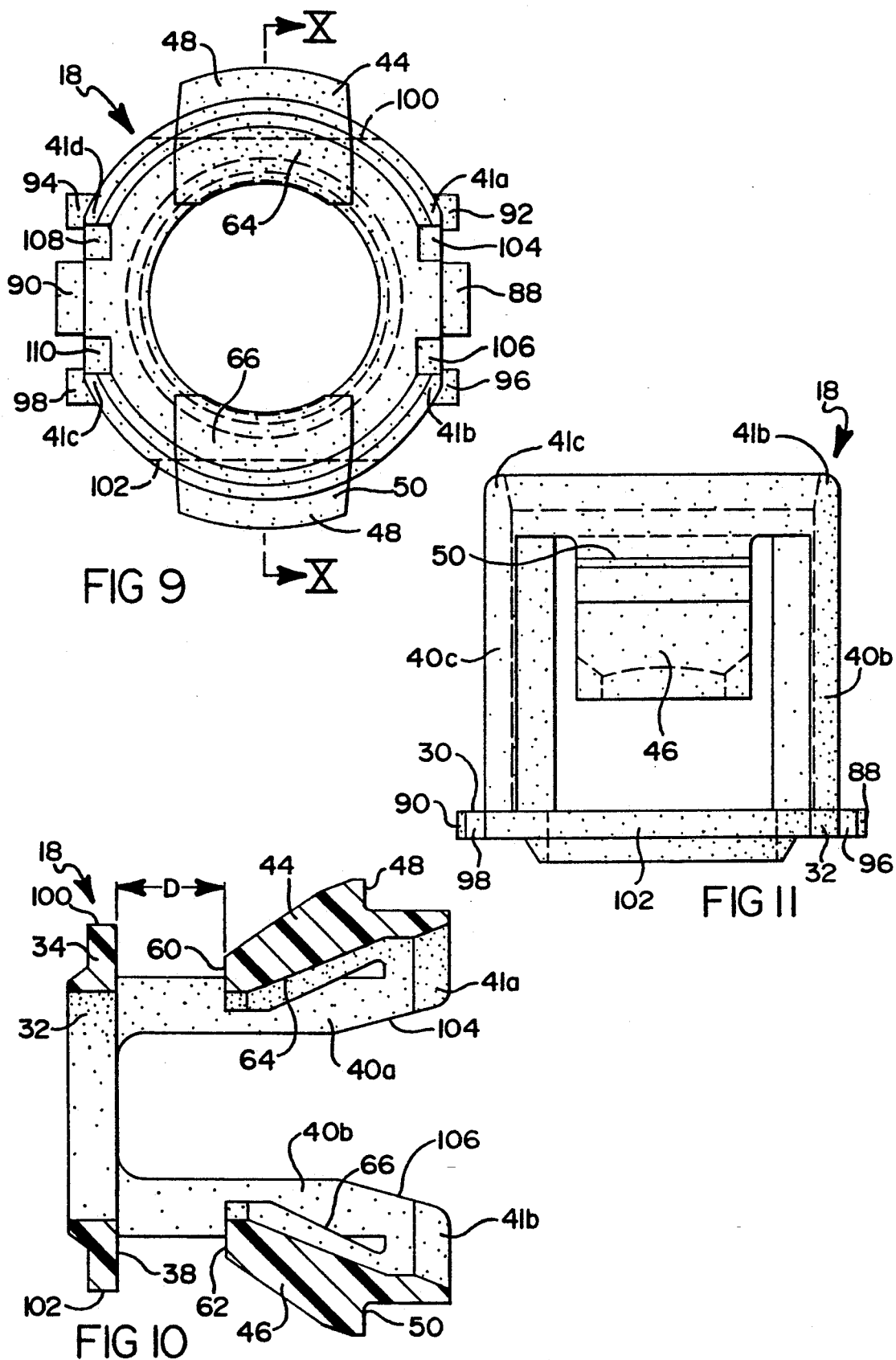

RETAINER FOR POP-TOP INDICATOR

INTRODUCTION

The present invention relates to quick connectors and, more particularly, to quick connectors having means enabling, by external inspection, determination of proper coupling between the male and female portions of the connector.

CROSS-REFERENCE

The present invention is related to U.S. Pat. No. 5,178,424 issued Jan. 12, 1993, to the same inventor and assignee of interest as the present application. U.S. Pat. No. 5,178,424 is hereby incorporated within this specification by reference.

BACKGROUND OF THE INVENTION

It is desirable in fluid handling conduits to ensure that the connectors used have their male and female portions properly coupled together. A faulty connector enables an associated host system to leak fluid. This can be particularly disadvantageous when the system is under pressure and the leaking connector expels the pressurized fluid.

In the quick connector field, where male and female portions of the connectors are held together by friction locking members, it is important that the male and female portions be properly coupled. To ensure proper coupling, the installer may tug on or manipulate the connector to make sure that it is fully engaged. Also, visual types of inspecting devices enable the installer to confirm that the male and female portions are properly coupled together from observation alone.

U.S. Pat. No. 4,925,217 Ketcham discloses a quick connector with a visual checking feature wherein a deformable member is assembled within the fitting which includes elongated members extending out of the housing between the male and female portions prior to coupling and which are retracted, and no longer visible, once the coupling has been accomplished. Although this type of connector may work satisfactorily for its intended purpose, designers are always trying to improve the field. Furthermore, designs such as that employed by Ketcham provide only relatively small axial movement of the indicator member, which, when employed with relatively low cost, high tolerance manufacturing, limits the reliability of the perceived indication and, alternatively, adds additional expense to a more highly refined design. Lastly, the spring-like operation of Ketcham's vaulted annular member requires use of relatively expensive materials and can introduce additional failure modes, such as fracture of one of the legs 46 and 48 which could interfere with proper coupling operation.

A related problem stems from dual aspects of commercially available quick connect devices, to wit: high volume and low sale price frequently necessitating the use of inexpensive, somewhat pliable materials, and complex contours of extremely small inter-fitting components. These aspects collectively increase the likelihood of mis-assembly. High volume production techniques, including automated assembly tends to aggravate the problem wherein mis-assembly or impermissible dimensional variations of the components is difficult to detect.

BRIEF DESCRIPTION OF THE INVENTION

Accordingly, it is an object of the present invention to provide a visual inspection device which enables, at a glance, the installer to ensure proper coupling of the connector. Also, the present invention provides the art with a simple, inexpensive inspection device that overcomes the shortcomings of the prior art described hereinabove.

The inventive quick connector includes a generally cylindrical connector housing defining an axial opening for matingly receiving a male member. A retainer disposed substantially within the housing releasably interconnects the connector housing and male member. An insertion indicator also disposed partially within the housing is displaced axially upon interconnection of the connector housing and male member to provide a visual indication of the interconnection. Finally, index means rotationally fixes the retainer and insertion indicator with respect to the connector housing while allowing a limited freedom of relative axial movement therebetween. This arrangement has the advantage of permitting high speed automated preassembly of the female portion of the quick connector while ensuring against mis-alignment or mis-assembly thereof and eliminates the need for external alignment members.

In a broad sense, a quick connect insertion indicator includes a base member of generally annular configuration which is adapted for positioning about a male conduit within the connector housing. Two or more leg members extend axially from the base member and terminate near the opening. A generally annular indicator member which is positioned substantially adjacent to the opening is releasably engaged with the leg member terminations. Finally, means are provided operative to axially displace the base member upon engagement of the conduit and connector housing to effect separation of the base and indicator members. Guide means provide concentric positioning of the indicator member with the housing opening until coupling of the connector is complete.

In the preferred embodiment of the invention, the insertion indicator includes an annular base member and two circumferentially spaced axially elongated leg members dimensioned such that the leg members terminate internally adjacent a step formed at the axial housing opening. Guide means are provided to maintain concentric positioning of the indicator member as least partially within the housing opening, the base member defining an abutment surface disposed to engage a mating abutment surface defined by the conduit to axially displace the base and leg members upon engagement of the conduit and connector housing to effect simultaneous separation of the base and indicator members. This arrangement provides the advantage of minimizing the overall axial length of the quick connect fitting to enhance packaging thereof and avoids inadvertent release by requiring use of a special release tool.

According to another aspect of the invention, the insertion indicator defines axially elongated guide surfaces operative, to engage axially elongated guide slots formed within the connector housing to provide an axial freedom of relative displacement therebetween while prohibiting relative rotational displacement therebetween. This arrangement provides for precise positioning of the insertion indicator within the female housing to minimize the chance of mis-assembly or distortion of the components during coupling engagement. The slots and guide surfaces ensure that only relative axially displacement takes place during the engagement process and that rotation and skewing of the components will not occur.

According to another aspect of the invention, the guide slots are recessed within the internal dimension walls of the female member to receive the leg members, which are of generally rectangular cross-section and define the guide surfaces. The leg members are disposed substantially radially externally of the outer diameter surface of the base member. Furthermore, the retainer comprises a pair of opposed radially outwardly directed indexing tabs which are slidingly received within the guide slots. This arrangement provides the advantage of simultaneously aligning both the retainer and the insertion indicator elements within the female housing.

According to another aspect of the invention, a small arcuate sector of the indicator member is removed, or, alternately, a rupture point is provided therein, preferably in conjunction with a generally planer tab member which is integrally formed with and radially extending from the indicator member. This arrangement provides the advantages of ensuring retention of the indicator member upon the conduit after coupling has been accomplished and facilitating its removal, if required, thereafter.

According to still another feature of the invention, the base and leg members are formed integrally with the indicator member wherein either the indicator member or the leg members include predetermined weakened points, such as by reduced cross-sectional area that will simultaneously predictably fracture upon axial loading occasioned by coupling between the conduit and its mating connector housing.

These and other features and advantages of this invention will become apparent upon reading the following specification which, along with the drawings, describes and discloses preferred and alternative embodiments of the invention in detail.

A detailed description of the disclosed embodiments makes reference to the accompanying drawings.

BRIEF DESCRIPTION OF THE DRAWINGS

FIG. 1, is a perspective exploded view of a conduit quick connect assembly embodying the present invention;

FIG. 2, is a broken, cross-sectional view, on an enlarged scale, of a de-mated connector housing and male conduit;

FIG. 3, represents the connector housing and male conduit of FIG. 2 in the coupled condition;

FIG. 9, is a top plan view of a retainer employed with the present invention;

FIG. 10, is a cross-sectional view taken on lines X—X of FIG. 9;

FIG. 11, is a front plan view of the retainer of FIG. 9; and

DETAILED DESCRIPTION OF THE PREFERRED AND ALTERNATIVE EMBODIMENTS

Figure 4:
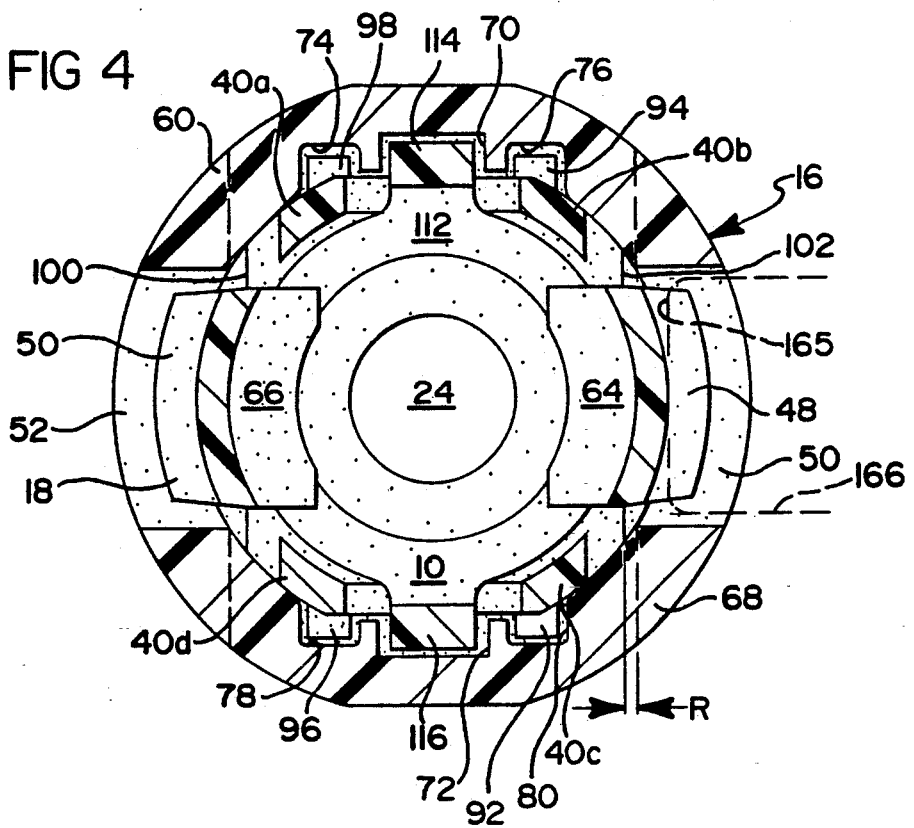
FIG. 4, is a cross-section view, on an enlarged scale, taken on lines IV—IV of FIG. 2.

Referring to FIG. 1, the present invention includes an insertion indicator device, shown generally at 10, for use with a quick connector, shown generally at 12, including male and female elements 14 and 16, respectively, and a locking member or retainer 18. With the exception of modifications described hereinbelow, quick connector 12 is representative of known commercially available devices. The quick connector 12 illustrated herein is adapted for application within systems employing tubular conduit, although it is contemplated that the present invention could be employed with other structural configurations and applications.

Male element 14 is illustrated as a thin wall metallic tube with an upset or external circumferential flange 20 integrally formed therein adjacent an open-end 22 adapted for insertion within a stepped through-passage 24 in female element 16. The end of female element 16 distal male element 14 has a series of external circumferential barbs 26 adapted for locking engagement with a resilient conduit (not illustrated). Locking member 18 is carried within an enlarged end 28 of female element 16 proximate male element 14 as will be described in greater detail hereinbelow.

As seen in FIG. 2, the through-passage 24 of female element 16 includes a stepped portion 30 within its enlarged end 28. Additional stepped portions may be provided to receive elements such as O-rings or the like (not illustrated) for sealing male element 14 within female element 16.

As best viewed in FIGS. 2 and 9-11, retainer 18 comprises a generally annular base portion 32 nestingly disposed concentrically within through-passage 24 terminating in a radially outwardly extending flange portion 34 received within a step 36 formed in female element 16 opening into stepped portion 30 and co-acting therewith to define a seat 38. Four (4) extensions 40a-d are integrally formed with base portion 32 and are circumferentially equally spaced thereabout and extend axially therefrom towards an opening 42 defined by the end of female element 16 for receiving male element 14. Locking member 18 defines two (2) inwardly directed male element engaging fingers 44, 46 depending from adjoining pairs of free ends (40a,d and 40b,c) of extensions 40. Fingers 44, 46 define radially outwardly directed abutment surfaces 48, 50 formed thereon which lockingly engage with one of a pair of opposed radial openings 52, 54 formed in female element 16. The uppermost (in FIG. 2), lateral surfaces of element 16 defining openings 52, 54 are designated as abutment surfaces 56, 58 which meetingly engage surfaces 48, 50 of retainer 18. The axially opposed ends of fingers 44, 46 define radially extending abutment surfaces 60, 62, which are, in assembly, axially spaced from seat 38 by a dimension "D" as will be described in detail hereinbelow. Fingers 44, 46 define radially inwardly tapered ramp surfaces 64, 66, extending through their axial length.

Both female element 16 and retainer 18 are made of injection molded plastic or other suitable material. Quarter cross-sections are employed in FIG. 5 for simplicity inasmuch as the structure is substantially symmetrical about the centerline axis A—A of female element 16. Lastly, certain interior components that typically would be employed with female element 16, such as sealing O-rings and spacers which normally would be disposed within through-passage 24, are deleted here for the sake of brevity.

Aligned pairs of tangential slots 68 formed in the outer surface of female element 16 open into radial openings 52, 54 as is described in co-pending application U.S. Ser. No. 07/675,374, filed Mar. 16, 1991, now U.S. Pat. No. 5,152,555 entitled "Quick Connect Insertion Indicator Clip", assigned to the same assignee of interest, which is incorporated herein by reference.

Figure 5:
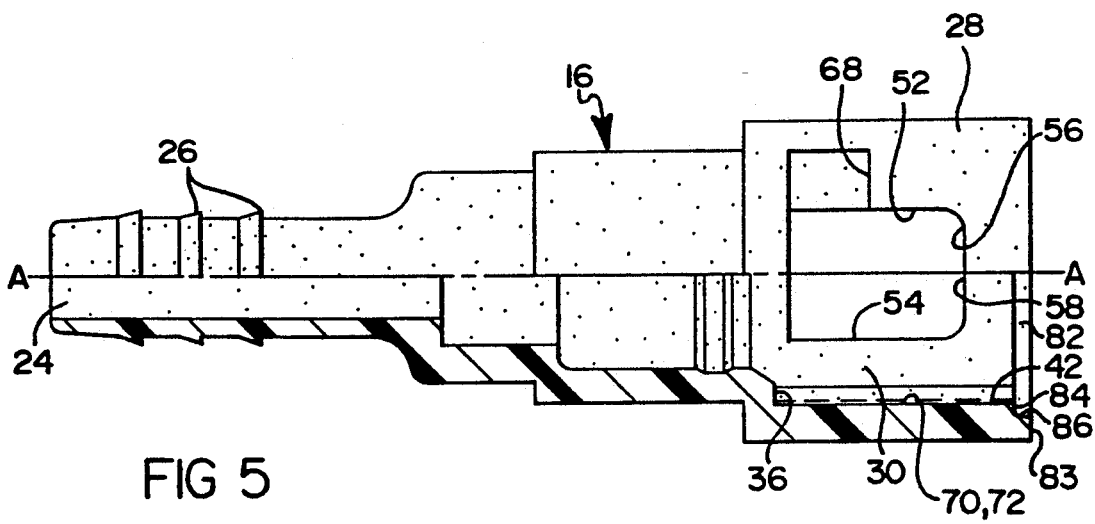
FIG. 5, is a quarter cross-section view of the female housing of FIG. 2 taken from the top.

Referring to FIGS. 4 and 5, stepped portion 30 of female element 16 has complementary circumferentially opposed axially elongated guide grooves 70, 72 formed in the inner-diameter surface of end 28 and opening into through-passage 24. Grooves 70, 72 are rotationally positioned approximately 90 degrees offset from radial openings 52, 54. Laterally opposed side grooves 74, 76 straddle groove 70, extending axially through stepped portion 30 and opening into through-passage 24. Likewise, side grooves 78, 80 are axially parallel to and straddle groove 72 and open radially into through-passage 24.

Opening 42 defines a stepped annular groove 82 composed of an axial outwardly facing abutment surface 84 and radially outwardly diverging alignment surface 86.

Referring to FIGS. 9 through 11, the structural details of retainer 18 are illustrated. Indexing tabs 88, 90 integrally formed with flange portion 34 of base portion 32 extend radially outwardly therefrom and are dimensioned to slip-fit within guide grooves 70, 72. Likewise, laterally spaced tangential indexing tabs 92, 94, 96, and 98, extend radially outwardly generally parallel to tabs 88, 90. Tabs 92 through 98 are, likewise, dimensioned to fit within their respective grooves 74 through 80. Flats or reliefs 100, 102 are formed in the circumferential wall of flange 34 in locations 90 degrees tangentially offset from tabs 88, 90 and are spaced radially inwardly of the inside diameter surface portion of end 28 which defines radial openings 52, 54 to ensure that flange 34 does not interfere with the use of an O.D. release tool as it penetrates openings 52, 54 to effect release of retainer 18 from female element 16. As best depicted in FIGS. 2 and 4, an O.D. release tool 166 shown in FIG. 4 in phantom will radially depress fingers 44, 46 inwardly until the radially outermost edges of abutment surfaces 48, 50 are radially inwardly spaced from the innermost edges of abutment surfaces 56, 58 to effect release. Typical prior art retainers had a constant radius flange which could interfere with the axially innermost transverse surface 165 of tool 166 and prevent release. The local radial clearance 168 (designated R in FIG. 4) provided by flats 100, 102 allows removal of retainer 18 with tool 166 still in place. Ideally, the radially outer surfaces of flats 100, 102 are disposed substantially inwardly of the innermost radial edges of abutment surfaces 56, 58. A further understanding of the present invention's interrelationship with tool 166 can be gleaned from U.S. Ser. No. 07/807,288 entitled "Universal O.D. Release Tool" filed Dec. 13, 1991 now U.S. Pat. No. 5,226,230 having common assignee and inventor as the present invention which is hereby incorporated by reference. Tapered clearance relief surfaces 104, 106, 108, and 110 are formed in extensions 40 to prevent binding between male element 14 and retainer 18 during release. Lastly, the overall axial length of extensions 40a–d is abbreviated whereby the free ends 41a–d thereof distal base portion 32 are dimensioned to terminate adjacent abutment surface 84 of female element 16.

Figure 6:
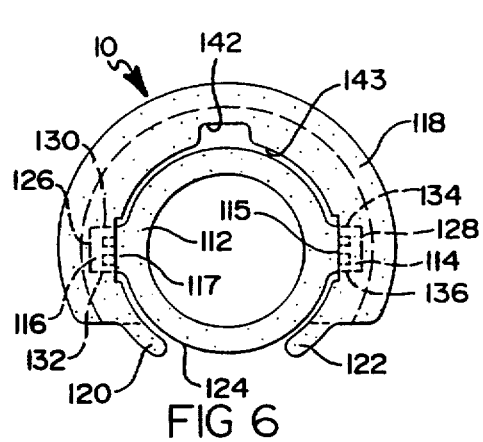
FIG. 6, is a top plan view of the preferred quick connect insertion indicator of the present invention.
Figure 8:
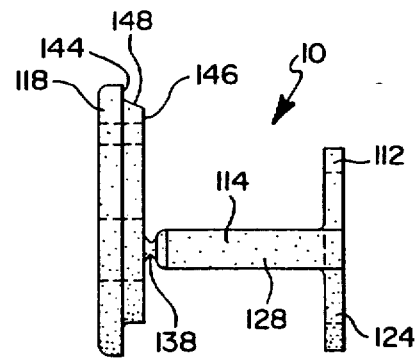
FIG. 8, is a side plan profile view of the insertion indicator of FIG. 6.
Figure 7:
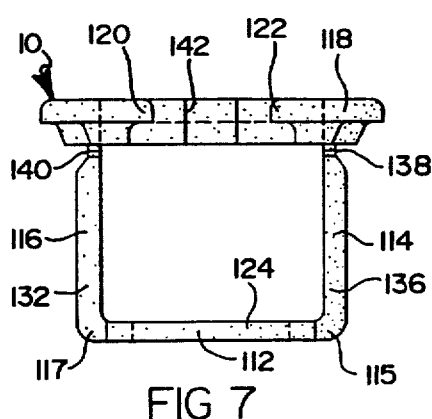
FIG. 7, is a front plan view of the insertion indicator of FIG. 6.

Referring to FIGS. 6 through 8, the structural details of inventive insertion indicator device 10 are illustrated. Indicator device 10 is constructed integrally from injection molded plastic or other suitable material and includes a generally annular base member 112, two circumferentially opposed axially elongated leg members 114, 116 and a generally annular indicator member 118. Base member 112 has a characteristic outside diameter equal to or slightly less than the lateral spacing of flats 100, 102 to prevent interference with surface 165 of tool 166. Indicator member 188 has an approximately 90 degree circumferential section removed, rendering it U-shaped, and defining a permanent opening between circumferential fingers 120, 122 which are spaced approximately one half of the diameter of male element 14 to ensure that after coupling, indicator member 118 remains engaged with its associated male element 14 until it is intentionally removed therefrom. The radially innermost surfaces of leg members 114, 116, are tangentially integrally joined with necks 115, 117 formed on the outer diameter circumferential surface 124 of base member 112 and extend radially outwardly therefrom. Leg members 114, 116 are generally rectangular in cross-section and define opposed radially outwardly facing guide surfaces 126, 128, as well as opposed lateral guide surfaces 130 through 136. Each leg member 114, 116 extends from base member 112 to an opposed end which is integrally formed with indicator member 118. In the preferred embodiment, the point of interface between leg members 114, 116 and indicator member 118 forms a necked region 138, 140 which are dimensioned identically to ensure as close as possible equal pull-apart strength.

Indicator member 118 includes a generally rectangular recess 142 formed in the inner diameter surface 143 thereof. Indicator member 118 has a stepped typical cross-section defined by a rightwardly facing (as viewed in FIG. 8) radially outwardly extending circumferential abutment surface 144 and a right-hand most inner abutment surface 146 interconnected by a circumferential tapered fillet 148.

Quick connector 12 and indicator device 10 are provided with a system of guide surfaces which facilitates automated assembly and substantially reduces the likelihood of mis-assembly or component damage resulting from the assembly process. Grooves 70 through 80 interact with indexing tabs 88 through 98 on retainer 18 as well as leg members 114, 116 of indicator device 10 to provide positive indexing therebetween to ensure against rotational mis-positioning. Multiple, laterally spaced sets of grooves 74, 70, 76 and 78, 72, 80 are provided to enhance the purchase of retainer 18 (via tabs 98, 90, 94 and 96, 88, 92, respectively) upon female element 16 to further reduce the likelihood of rotational mis-positioning by increasing the characteristic maximum chord dimension from the central axis. Because grooves 70 through 80 extend axially the entire length of end 22 of female element 16, they afford proper indexing of retainer 18 and indicator device 10 during the entire assembly process wherein retainer 18 and then indicator device 10 are sequentially axially inserted into female element 16 through opening 42. When fully inserted, base portion 32 of retainer 18 abuts step 36 of female element 16 and abutment surfaces 48, 50 of engaging fingers 44, 46 resiliently expand into radial openings 52, 54 to provide a lock-fit therebetween. Thereafter, as indicator device 10 is inserted, its base member 112 ramps axially along abutment surfaces 64, 66, momentarily resiliently displacing fingers 44, 46 radially outwardly until base member 112 is axially intermediate abutment surfaces 60, 62 and seat 38. Thus, indicator device 10 is positively retained within female element 16 by retainer element 18. Indicator device 10 insertion is complete when indicator member 118 surfaces 144, 146 and 148 abut female element 116 surfaces 83, 84 and 86, respectively. The radially extending surface of base member 112 facing abutment surfaces 60, 62, defines a seat for the leading edge of flange 120 of male element 14. It is thus, essential that dimension D as best seen in FIG. 2, provide for tolerance stack-up of axial dimension of flange 20, base member 112 and base portion 32.

Grooves 70, 72 are radially deep enough to substantially receive the section of leg members 112, 114 to ensure clearance for the insertion of male element 14 while maintaining axial freedom of movement of base member 112.

As best viewed in FIG. 2, indicator device 10 is illustrated in a first condition indicative of non-engagement between male and female elements 14 and 16. The leg members 114, 116 extend axially toward opening 42 to engage indicator member 118 such that abutment surface 144 of indicator member 118 abuts the upward most portion 83 (upward most as viewed in FIGS. 2 and 3) portion or transverse face 150 of female element 16. A substantial portion of indicator member 118 nests within groove 82 with abutment surface 146 abutting abutment surface 84 and alignment surface 86 following the contour of fillet 148 to effect a self-centering of indicator member 118 within opening 42.

Leg members 114, 116 are provided with a characteristic length which, in the precoupling condition illustrated in FIG. 2, suspends base member 112 axially from seat 38 of base portion 32 of retainer 18. Because surfaces 126 through 136 are in intimate sliding relationship with respect to grooves 170 through 180, base member 112 is secured from rotation or skewing prior to during and after the coupling process of quick connector 12.

Referring to FIGS. 2 and 3, during the mating process of connector 12, end portion 22 of male member 14 enters through-passage 24, passing through the inner-diameter of both indicator and base members 112 and 118 of indicator device 10 and base portion 32 of retainer 18. Flange 20 of male element 14 is dimensioned to axially ramp along surfaces 64, 66 of fingers 44, 46 until the trailing edge thereof passes abutment surfaces 60, 62, at which point fingers 44, 46 will resiliently snap radially inwardly to entrap flange 20 in its position as illustrated in FIG. 3. As the insertion process continues, the leading (lowermost) edge of abutment flange 20 contacts the upwardmost abutment surface of base member 112. Further downward displacement of male element 14 will carry base member 112 of insertion device 10 therewith. In so doing, leg members 114, 116 will be placed in tension, causing fracture thereof at neck regions 138, 140. Because indicator device 10 is positionally controlled during the coupling process, fracturing at neck regions 138, 140, is extremely predictable and takes place virtually simultaneously. This is in marked contrast to earlier designs in which one leg often would separate prior to the other causing the base member 112 to become distorted and possibly prevent full engagement of quick connector 12. Insertion is complete when the leading (lowermost) edge of base member 112, driven by circumferential flange 20, abuts seat 38. At this point, the trailing edge of flange 20 is passed downwardly past abutment surfaces 60, 62, of finger members 44, 46, which then snap radially inwardly, entrapping flange 20 as well as base member 112 of indicator device 10 in its designated installed position as illustrated in FIG. 3.

As shown in FIG. 2, the axial spacing (B-A) between the lowermost surface of base member 112 and the uppermost surface of seat 38 must be sufficient to accommodate a small degree of resiliency inherent in the material from which indicator device 10 is formed and ensure rupture at neck regions 138, 140. Upon such rupture, the tensional loading of leg members 114, 116 will cause a snap-back reaction as indicated by arrows 152, causing indicator member 118 to be actually ejected axially away from female element 16. Thereafter, it will be loosely retained on the portion of male element 14 leading away from the coupling in such a manner as to be clearly indicative of separation and thus a complete coupling has taken place. Alternately, indicator member 118 can be removed by grasping it about its peripheral surface and resiliently distorting fingers 120, 122 for removal from male element 14. Recess 142 has a secondary function in that it creates a weakened or hinge point to enhance removal of indicator member 118 from male element 14.

Figure 12:
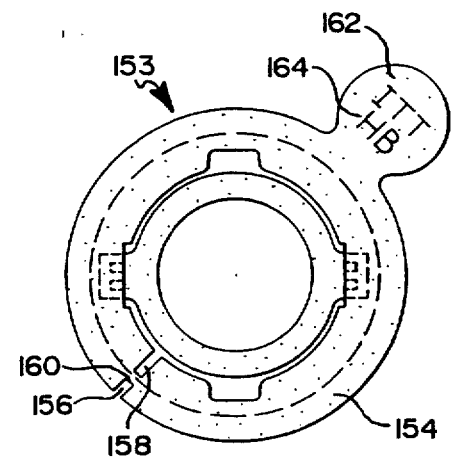
FIG. 12, is a top plan view of an alternative embodiment of the quick connect insertion indicator of the present invention.

Referring to FIG. 12, an alternative embodiment of an indicator device 156 is illustrated which differs only in that an associated indicator member 154 is completely annular and is contemplated for applications where it may be desirable to allow it to permanently encircle male element 14 throughout the life cycle of the fitting. Indicator member 154 is provided with radial slits 156, 158 with only a thin section of web 160 remaining therebetween. If removal is desired, indicator member 154 can be removed by gripping it manually or with a tool and pulling radially away from male element 14, rupturing web 160 in the process. Removal is further enhanced by a provision of a generally planer finger tab 162 extending radially therefrom which is integrally formed with indicator member 154 of indicator device 153 and optionally provided with instructional indicia 164. The remainder of the construction of indicator device 153 is as was described with reference to the preferred embodiment illustrated in detail in FIGS. 6 through 8.

It is to be understood that the invention has been described with reference to a specific embodiment and variations to provide the features and advantages previously described and that the embodiments are susceptible of modification as will become apparent to those skilled in the art. For example, it is contemplated that leg members 114, 116 could terminate in a snap-apart, reusable fitting such as described in U.S. Pat. No. 5,178,424. Accordingly, the foregoing is not to be construed in a limiting sense.

What is claimed is:

1. A quick connect insertion indicator comprising:
   a generally annular base member carried with a connector housing adapted for positioning about a conduit;
   a plurality of leg members extending axially from said base member and terminating adjacent an axial housing opening; a generally annular indicator member for visually indicating proper coupling of said conduit disposed substantially adjacent said opening releasably engaging said leg member terminations;

means operative to axially displace said base member upon engagement of said conduit and connector housing to effect separation of said base and indicator members; and guide means operative to maintain concentric positioning of said indicator with said connector housing.

2. A quick connect insertion indicator comprising:

a generally annular base member adapted for positioning about a conduit within a connector housing;

a plurality of circumferentially spaced, axially extending elongated leg members terminating internally adjacent an axial housing opening;

a generally annular indicator member disposed substantially adjacent said opening releasably engaging said leg member terminations; and guide means operative to maintain concentric positioning of said indicator with said connector housing, said base member defining an abutment surface disposed to engage a mating abutment surface defined by said conduit to axially displace said base and leg members upon engagement of said conduit and connector housing to effect substantially simultaneous separation of said base and indicator members.

3. The quick connect insertion indicator of claim 2, wherein said base and leg members are integrally formed of injection molded plastic.

4. The quick connect insertion indicator of claim 2, wherein said base member has an outside diameter dimensioned less than the inside diameter dimension of said housing opening and an inside diameter dimensioned slightly greater than the nominal outside diameter dimension of said conduit and slightly less than the outside diameter dimension of said conduit abutment surface.

5. The quick connect insertion indicator of claim 2, wherein said indicator member has an inside diameter dimensioned slightly greater than the outside diameter dimension of said conduit abutment surface.

6. The quick connect insertion indicator member of claim 2, wherein said indicator member is integrally formed with said base and leg members, and said leg members include a predetermined weakened point operative to predictably fracture under axial loading to effect said separation.

7. The quick connect insertion indicator member of claim 2, wherein said indicator member is integrally formed with said base and leg members, and said indicator member includes at least one predetermined weakened point operative to predictably fracture under axial loading to effect said separation.

8. The quick connect insertion indicator of claim 2, wherein said indicator member includes at least one predetermined rupture point operative to enable removal thereof from said conduit after separation from said leg members.

9. The quick connect insertion indicator of claim 2, further comprising a generally planar tab member radially extending from said indicator member.

10. The quick connect insertion indicator of claim 9, wherein said tab member comprises visually sensible indicia.

11. The quick connect insertion indicator of claim 2, wherein said indicator member includes a circumferential opening therein.

12. The quick connect insertion indicator of claim 11, wherein said circumferential opening extends about 90 degrees.

13. The quick connect insertion indicator of claim 2, wherein said guide means comprises a radially stepped, outer peripheral surface of said indicator member adapted to be nestingly received within a radially stepped recess within said housing opening.

14. The quick connect insertion indicator of claim 13, wherein said stepped outer peripheral surface includes a radially upwardly tapered surface portion operative to self-center said indicator member with said housing opening.

15. The quick connect insertion indicator of claim 2, wherein said indicator defines axially elongated guide surfaces operative, in application, to engage axially elongated guide slots formed in said connector housing to provide axial freedom of relative displacement while prohibiting relative rotational displacement therebetween.

16. The quick connect insertion indicator of claim 15, wherein said guide surfaces are formed on said leg members.

17. The quick connect insertion indicator of claim 16, wherein said leg members are disposed substantially radially externally of an outer diameter surface of said base member.

18. The quick connect insertion indicator of claim 17, wherein said leg members are generally rectangular in cross-section and define both radial and opposed lateral guide surfaces.

19. In combination:

a quick connector assembly including mating male and female elements and locking means operative to positively interconnect said elements in a fixed relative orientation, said female element defining a generally cylindrical housing portion substantially enclosing said locking means, said housing portion forming a radially outwardly directed step at an open end thereof for receiving said male element and a seat at an end opposed from said open end, said male element defining an external annular bead dimensioned to be nestingly received by said seat, and said locking means defining a plurality of circumferentially spaced, axially extending resilient finger members defining radially inwardly directed ramp surfaces and abutment surfaces at an end thereof distal said housing open end operative to entrap said bead between said seat and abutment surfaces; and an insertion indicator including a generally annular base member disposed about said male element within said female element, said insertion indicator further including a plurality of circumferentially spaced, axially extending elongated legs carried by said base member and terminating adjacent said open end, a generally annular indicator member disposed substantially adjacent said open end releasably engaging said leg member terminations, and guide means operative to maintain concentric positioning of said indicator at least partially within said connector housing, said base member defining an internal abutment surface disposed to engage said annular bead to axially displace said base member upon interconnection of said elements to effect simultaneous separation of said base and indicator members.

20. The combination of claim 19, wherein said finger members are equally circumferentially spaced.

21. The combination of claim 20, wherein said legs and finger members are circumferentially interdigitated.

22. The combination of claim 19, wherein there are two finger members and two leg members.

23. The combination of claim 19, wherein prior to engagement, said base member is axially spaced from the open end of said female element (dimension A), and said seat is axially spaced from the open end of said female element (dimension B), wherein A is less than B.

24. The combination of claim 19, wherein said housing portion and insertion indicator comprise cooperating axially elongated guide surfaces operative to provide axial freedom of relative displacement while prohibiting relative rotational displacement therebetween.

25. The combination of claim 24, wherein said guide surface associated with said insertion indicator is formed on said legs.

26. The combination of claim 24, wherein said guide surface associated with said housing portion comprises axially extending channels formed on the inside diameter surface thereof.

27. The combination of claim 26, wherein said guide surface associated with said housing portion comprises first and second sets of parallel, laterally spaced radially inwardly directed, axially 28. A quick connector comprising:

a generally cylindrical connector housing defining an axial opening for matingly receiving a male member;

a retainer having a continuous periphery at one axial end disposed substantially within said housing operative to releasably interconnect said connector housing and male member; and index means comprising generally axially extending grooves and mating means operative to rotationally fix said retainer with respect to said connector housing and to effect a limited freedom of relative axial movement therebetween further including an insertion indicator disposed partially within said housing axially displaceable in response to interconnection of said connector housing and male member to effect a visually sensible indication thereof, said index means further operative to rotationally fix said insertion indicator with respect to said connector housing and to effect limited freedom of relative axial movement therebetween.

29. The quick connector of claim 28, wherein said index means includes at least one axially extending radially inwardly opening guide slot formed in an inside diameter surface of said connector housing and associated locating tabs carried by both said retainer and insertion indicator extending radially outwardly within said slot to rotationally fix said housing, retainer and insertion indicator while enabling limited relative axial movement therebetween.

* * * * *

UNITED STATES PATENT AND TRADEMARK OFFICE
CERTIFICATE OF CORRECTION

PATENT NO. : 5,297,818
DATED : Mar. 29, 1994
INVENTOR(S) : Klinger, Gary It is certified that error appears in the above-identified patent and that said Letters Patent is hereby corrected as shown below:

In column 11, claim 27, line 29, after "axially" insert
--extending channels formed on the inside.--

Signed and Sealed this

Sixteenth Day of August, 1994

*Attest:*

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,297,818
DATED : March 29, 1994
INVENTOR(S) : Klinger, Gary

It is certified that error appears in the above-indentified patent and that said Letters Patent is hereby corrected as shown below:

Drawing Sheet 3 of 4 deleted Figures 3 & 4 and replaced with the attached sheet.

Signed and Sealed this

Twenty-sixth Day of September, 1995

Attest:

BRUCE LEHMAN

Attesting Officer          Commissioner of Patents and Trademarks